(12) United States Patent
Kim

(10) Patent No.: US 7,771,231 B2
(45) Date of Patent: Aug. 10, 2010

(54) MOUNTING SOCKET FOR MEMORY CARD AND SIM CARD FOR MOBILE PHONE

(75) Inventor: Jung-Hoon Kim, Seoul (KR)

(73) Assignee: Tyco Electronics AMP Korea Ltd.., Kyungsangbuk-Do (KR)

( * ) Notice: Subject to any disclaimer, the term of this patent is extended or adjusted under 35 U.S.C. 154(b) by 0 days.

(21) Appl. No.: 12/132,808

(22) Filed: Jun. 4, 2008

(65) Prior Publication Data

US 2008/0299829 A1 Dec. 4, 2008

(30) Foreign Application Priority Data

Jun. 4, 2007 (KR) ...................... 10-2007-0054528

(51) Int. Cl.
*H01R 13/73* (2006.01)
(52) U.S. Cl. ................ 439/541.5; 439/630; 439/607.24
(58) Field of Classification Search ................. 439/630, 439/608, 607.05–607.07, 541.5, 217–218, 439/607.23, 607.24, 79

See application file for complete search history.

(56) References Cited

U.S. PATENT DOCUMENTS 5,688,130 A * 11/1997 Huang ...................... 439/541.5
6,261,106 B1 * 7/2001 Tung ........................ 439/541.5
6,609,936 B2 * 8/2003 Bricaud et al. .............. 439/630
7,118,420 B1 * 10/2006 Lai et al. .................... 439/630
2006/0116025 A1 * 6/2006 Choy ......................... 439/630

FOREIGN PATENT DOCUMENTS

JP 2001-307801 11/2001

* cited by examiner

*Primary Examiner*—Felix O Figueroa
(74) *Attorney, Agent, or Firm*—Barley Snyder LLC

(57) ABSTRACT

A mounting socket includes an insulating socket body provided with a card insertion recess, a plurality of first terminal receiving openings and a plurality of second terminal receiving openings. The card insertion recess extends over a portion of the socket body provided with the second terminal receiving openings. The first terminal receiving openings are provided in a remainder of the socket body. Memory card connecting terminals are arranged in the first terminal receiving openings and extend above an upper surface of the socket body. Subscriber identification module card connecting terminals are arranged in the second terminal receiving openings and extend into the card insertion recess. A metal separating plate substantially covers the subscriber identification module card connecting terminals and defines a top surface of the card insertion recess. A metal card housing substantially covers the memory card connecting terminals.

14 Claims, 6 Drawing Sheets

MOUNTING SOCKET FOR MEMORY CARD AND SIM CARD FOR MOBILE PHONE

CROSS-REFERENCE TO RELATED APPLICATIONS

This application claims the benefit of the filing date under 35 U.S.C. §119(a)-(d) of Korea Patent Application No. 10-2007-0054528, filed Jun. 4, 2007.

FILED OF THE INVENTION

The present invention relates to a mounting socket for a memory card and a subscriber identification module (SIM) card for a mobile phone.

BACKGROUND

Generally, a memory card is used as an external element, to expand a storage space in a variety of equipment, such as a mobile phone, personal digital assistant (PDA), digital camera, and the like. On the basis of a size and standard thereof, the memory card has been introduced into a variety of forms, such as a secure digital (SD) memory card, multimedia card (MMC), compact flash (CF), memory stick, and the like. In addition, a subscriber identification module (SIM) card serves to store, for example, personal financial payment information, and is utilized as a non-contact type electronic credit card, traffic card, pre-paid card, and the like.

Nowadays, the utilization of the SIM card is gradually increasing, for example, for various functions of mobile phones. In particular, functionality of mobile phones is increasingly diversified. Mobile phones can be used, for example, as payment methods when a credit card is received in a phone body, as well as a player of music and moving images. However, most conventional mobile phones have been mainly fabricated in such a way that a memory card is incorporated therein to achieve a video-on-demand (VOD) or moving picture experts group layer—3 Audio (MP3) player function. This fabrication has a problem of low utilization efficiency of the memory card because it is incorporated within the memory phone and prevents users from being able to expand memory capacity of the mobile phone.

An external memory card has been introduced to solve the above-described problem and a multiplicity of technologies for mounting the memory card in a mobile phone, together with a SIM card, have been developed. FIGS. 5-6 show a conventional mounting socket for a memory card M and a SIM card S installed in a conventional mobile phone P. The mobile phone P includes a memory card socket 100 provided to allow the memory card M to be inserted into or separated from an insertion opening H formed in one side of the mobile phone P. A SIM card mount 200 includes a plurality of SIM card connecting terminals 201 and SIM fixing pieces 202 integrally formed at a surface of the memory card socket 100. The SIM card mount 200 is used to fixedly couple the SIM card S to a rear surface of the mobile phone P in a state wherein a battery B is separated from the rear surface of the mobile phone P, such that the SIM card S is connected with the SIM card connecting terminals 201. The memory card M is inserted into the memory card socket 100 from one side of the memory card socket 100, and the SIM card S is coupled to the exposed rear surface of the mobile phone P such that it is mounted to the SIM card mount 200.

However, the above-described prior art has the following problems. The memory card socket 100, which separates the SIM card S and the memory card M from each other, and the SIM fixing pieces 202 are significantly thick, making application thereof to a slim mobile phone difficult. Furthermore, when applied to the mobile phone P, the memory card socket 100 is the main reason of relatively increasing a thickness of the mobile phone P.

SUMMARY

It is therefore an object of the present invention to provide a mounting socket for a memory card and a SIM card for a mobile phone, wherein the mounting socket has a reduced thickness, improving adaptability to a slim mobile phone. It is another object of the present invention to provide a mounting socket for a memory card and a SIM card for a mobile phone, which can assure easy separation and coupling of constituent components, resulting in easy assembly of the mounting socket. It is a further object of the present invention to provide a mounting socket for a memory card and a SIM card for a mobile phone, which can efficiently prevent a short circuiting between connecting terminals for the memory card and the SIM card and metal plates thereof.

This and other objects are achieved by a mounting socket comprising an insulating socket body provided with a card insertion recess, a plurality of first terminal receiving openings and a plurality of second terminal receiving openings. The card insertion recess extends over a portion of the socket body provided with the second terminal receiving openings. The first terminal receiving openings are provided in a remainder of the socket body. Memory card connecting terminals are arranged in the first terminal receiving openings and extend above an upper surface of the socket body. Subscriber identification module card connecting terminals are arranged in the second terminal receiving openings and extend into the card insertion recess. A metal separating plate substantially covers the subscriber identification module card connecting terminals and defines a top surface of the card insertion recess. A metal card housing substantially covers the memory card connecting terminals.

DETAILED DESCRIPTION OF THE EMBODIMENT(S)

Figure 1:
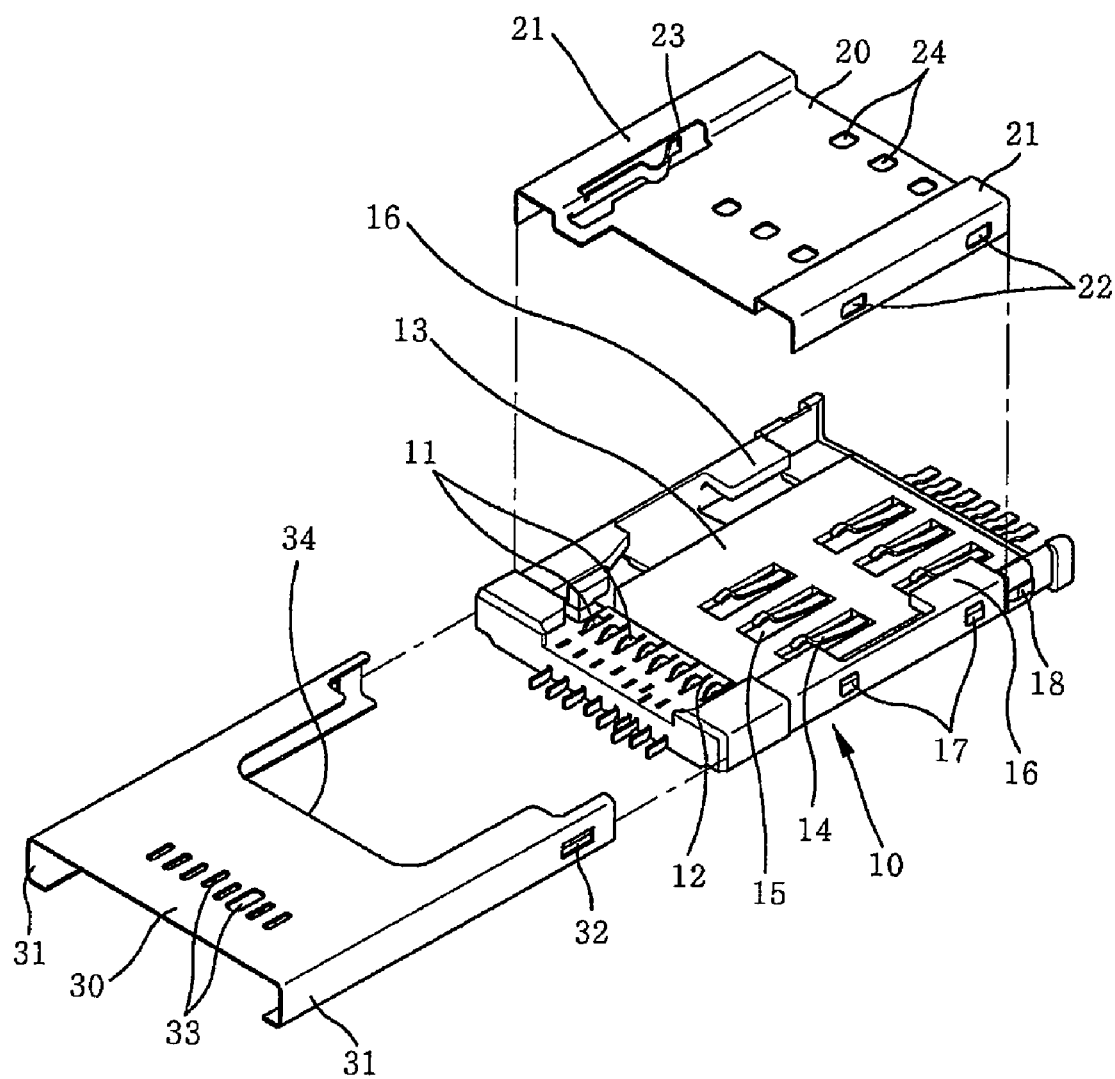
FIG. 1 is an exploded perspective view of a mounting socket according to the present invention.
Figure 2:
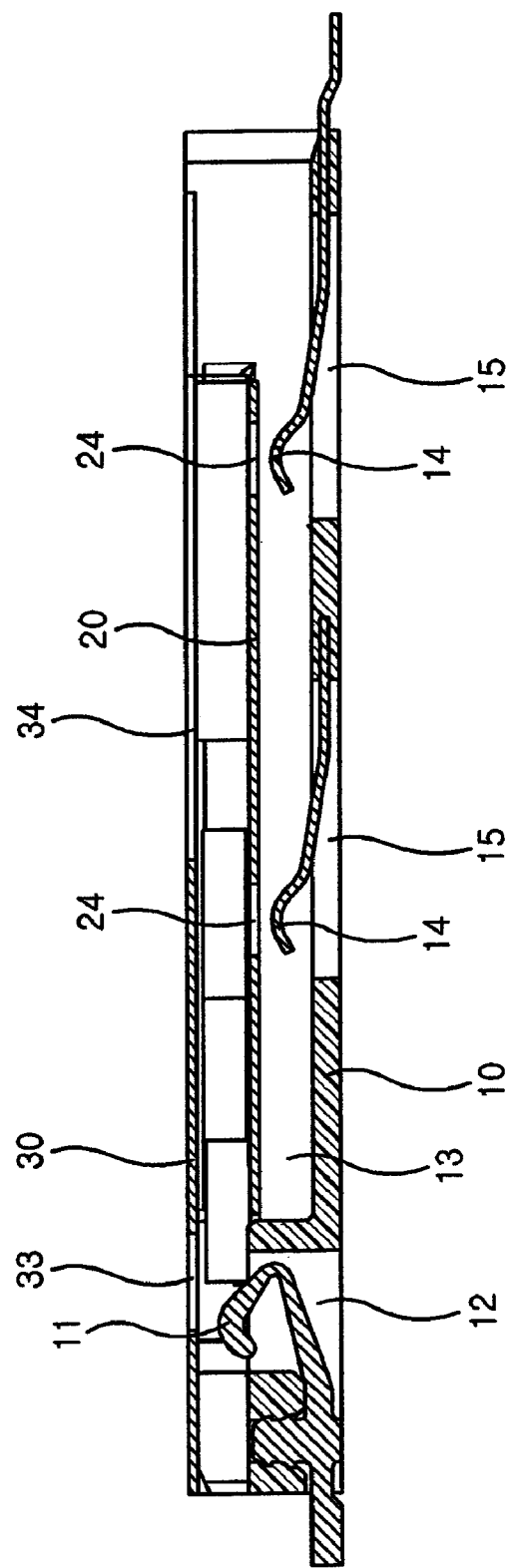
FIG. 2 is a side sectional view of the mounting socket of FIG. 1 shown in an assembled state.

Now, a preferred embodiment of the present invention will be described in more detail with reference to the accompanying drawings. FIG. 1 shows a mounting socket according to the present invention. As shown on FIG. 1, the mounting socket includes a socket body 10, a separating plate 20, and a card housing 30. The socket body 10 is formed, for example, of a nonmetallic insulating material. The socket body 10 has an card insertion recess 13 that extends over a portion of the socket body 10 that provides a space for insertion of a SIM card S. Second terminal receiving openings 15 for coupling SIM card connecting terminals 14 are formed in the card insertion recess 13 of the socket body 10. First terminal receiving openings 12 for coupling memory card connecting terminals 11 are formed in a remaining side region of the socket body 10. Accordingly, the memory card connecting terminals 11 are coupled into the first terminal receiving openings 12 from a lower surface of the socket body 10 such that they are exposed from the upper surface of the socket body 10. Also, the SIM card connecting terminals 14 are coupled to the second terminal receiving openings 15, so as to be exposed from a bottom surface of the card insertion recess 13. The socket body 10 is further formed at opposite side ends of the card insertion recess 13 with upwardly-protruding coupling portions 16. The upwardly-protruding coupling portions 16 are formed on an outer side surface of the socket body 10 with a pair of coupling protrusions 17. The socket body 10 further has outwardly-inclined protrusions 18 formed at distal ends of both side surfaces thereof.

The separating plate 20 is coupled to the upper surface of the socket body 10. The separating plate 20 may be, for example, metallic. The separating plate 20 is separably coupled to the upper surface of the socket body 10 such that it covers the card insertion recess 13 to define a top surface of the card insertion recess 13. The separating plate 20 is made of a thinner and harder metal material than the socket body 10. As a result of making the separating plate 20 with a thin metal plate, a significantly thin partition between a memory card M and the SIM card S can be acquired, reducing overall thickness of the mounting socket.

The separating plate 20 is formed at opposite side ends thereof with inverted U-shaped coupling portions 21. The upwardly-protruding coupling portions 16 of the socket body 10 are engaged into the inverted U-shaped coupling portions 21 of the separating plate 20 to removably assemble the separating plate 20 to the socket body 10 for easy assembly and disassembly of the socket body 10 and the separating plate 20. Each of the inverted U-shaped coupling portions 21 of the separating plate 20 is perforated, in an outer side surface thereof, with a pair of coupling openings 22. When the inverted U-shaped coupling portion 21 is inserted onto the upwardly-protruding coupling portion 16, the coupling protrusions 17 are elastically fitted into the respective coupling openings 22, thereby achieving further firm coupling between the socket body 10 and the separating plate 20.

Both the inverted U-shaped coupling portions 21 of the separating plate 20 are formed, at inner side surfaces thereof, with elastic supporting members 23, respectively. The elastic supporting members 23 serve to elastically support both sides of the memory card M when the memory card M is fitted to an upper surface of the separating plate 20. The separating plate 20 further has short-circuit-proof openings 24 formed at positions corresponding to upper ends of the SIM card connecting terminals 14. The short-circuit-proof openings 24 prevent the separating plate 20 from coming into contact with the upper ends of the SIM card connecting terminals 14, thereby efficiently preventing short-circuiting due to contact between the upper ends of the SIM card connecting terminals 14 and the separating plate 20.

The card housing 30 covers an upper surface of the socket body 10. The card housing 30 has an open bottom surface. The card housing 30 is fitted to the socket body 10 such that the memory card M can be fitted to the upper surface of the separating plate 20 above the socket body 10. The card housing 30 is made of a thinner and harder metal material than the socket body 10. As a result of making the card housing 30 with a thin metal plate, a significantly thin sheath for the memory card M can be acquired, reducing overall thickness of the mounting socket.

The card housing 30 includes side walls 31 having inwardly-bent low ends. Fixing openings 32 are formed at distal ends of both of the side walls 31 at positions corresponding to the outwardly-inclined protrusions 18. As both the side walls 31 of the card housing 30 slide along both the side surfaces of the socket body 10, the card housing 30 is coupled to the socket body 10. At a completely coupled position of the card housing 30, the outwardly-inclined protrusions 18 of the socket body 10 are elastically inserted into the fixing openings 32 of the card housing 30, thereby achieving further firm coupling between the card housing 30 and the socket body 10.

The card housing 30 further has short-circuit-proof openings 33 perforated at positions corresponding to upper ends of the memory card connecting terminals 11. The short-circuit-proof openings 33 prevent the card housing 30 from coming into contact with the upper ends of the memory card connecting terminals 11, thereby efficiently preventing short circuiting due to contact between the upper ends of the memory card connecting terminals 11 and the card housing 30. The card housing 30 further has a top opening 34 having an open end. The top opening 34 allows a user to easily grip the memory card when the user inserts or separates the memory card into or from the card housing 30, thereby assuring easy manual insertion/separation of the memory card.

Figure 3:
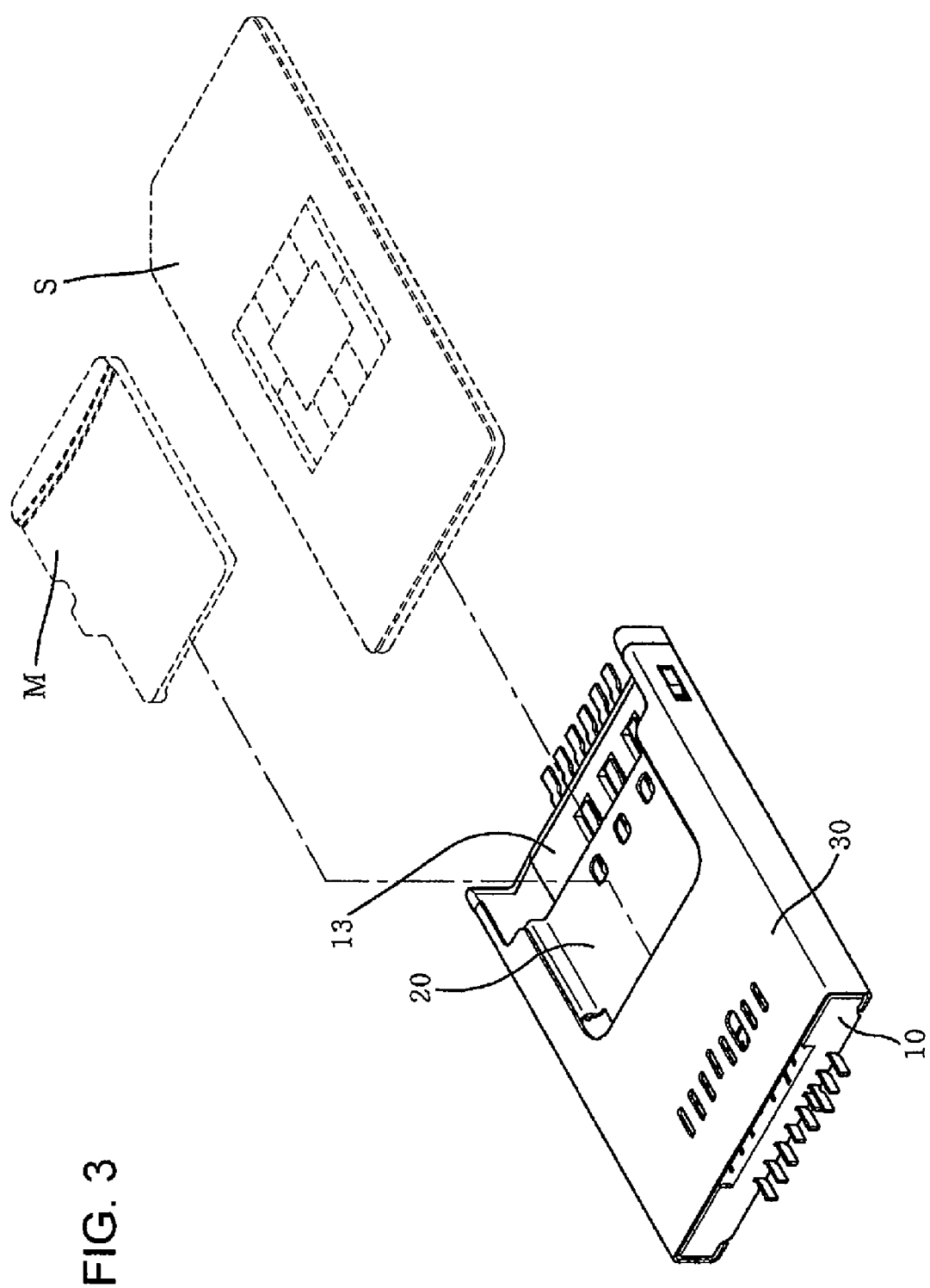
FIG. 3 is a partially exploded perspective view of the mounting socket of FIG. 1 showing the insertion of a memory and a SIM card therein.
Figure 4:
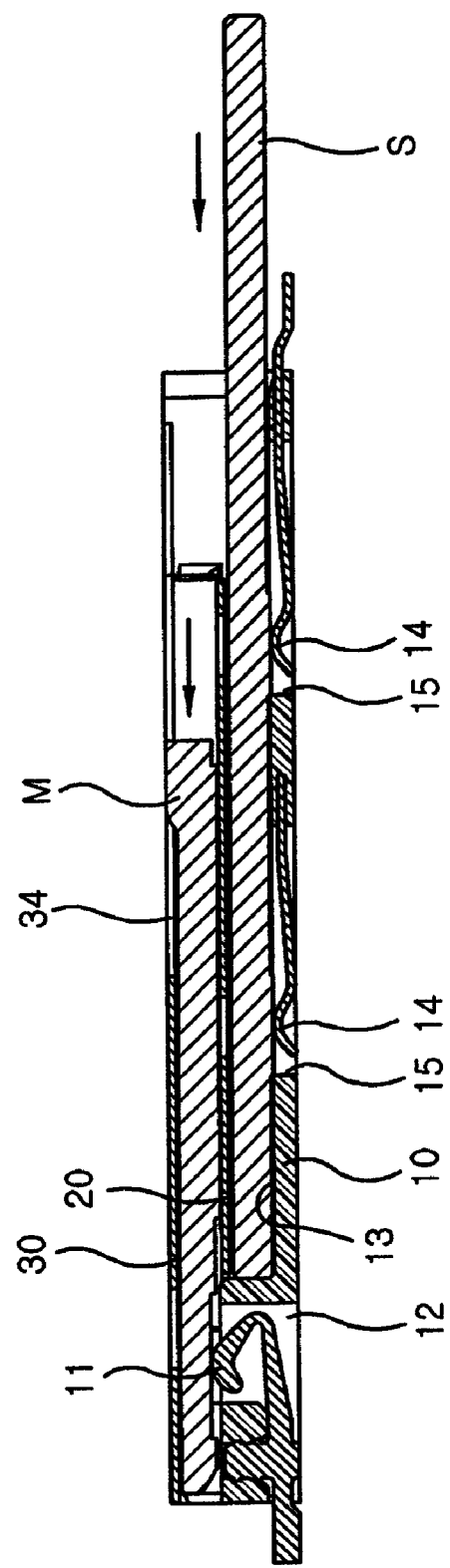
FIG. 4 is a side sectional view of the mounting socket of FIG. 1 shown in an assembled state with the memory card and the SIM card.
Figure 5:
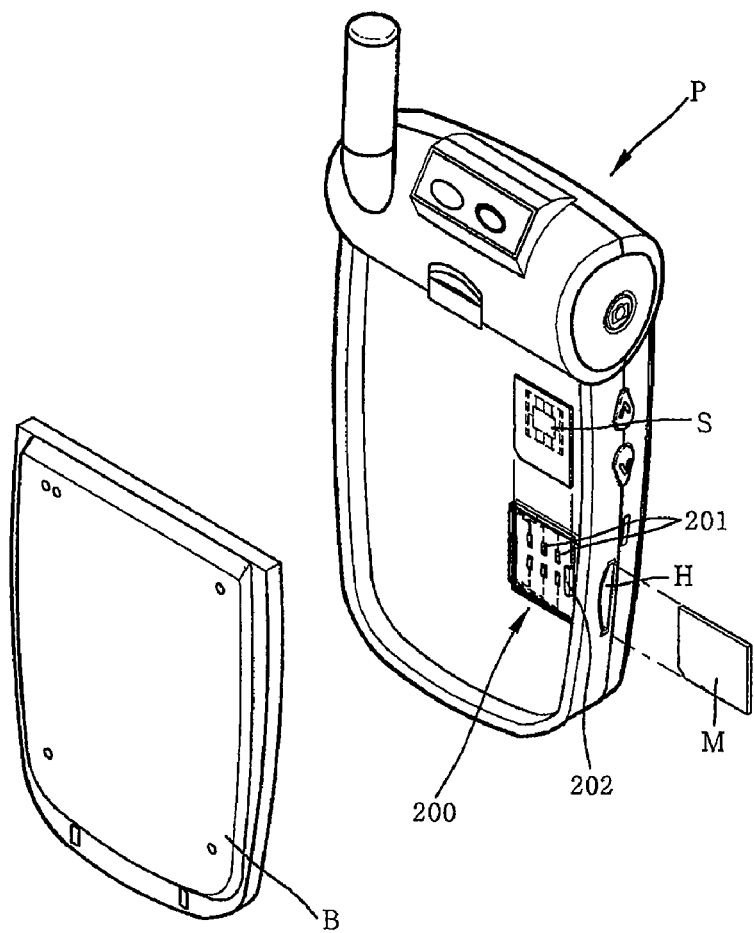
FIG. 5 is a partially exploded perspective view of a mounting socket according to the prior art.
Figure 6:
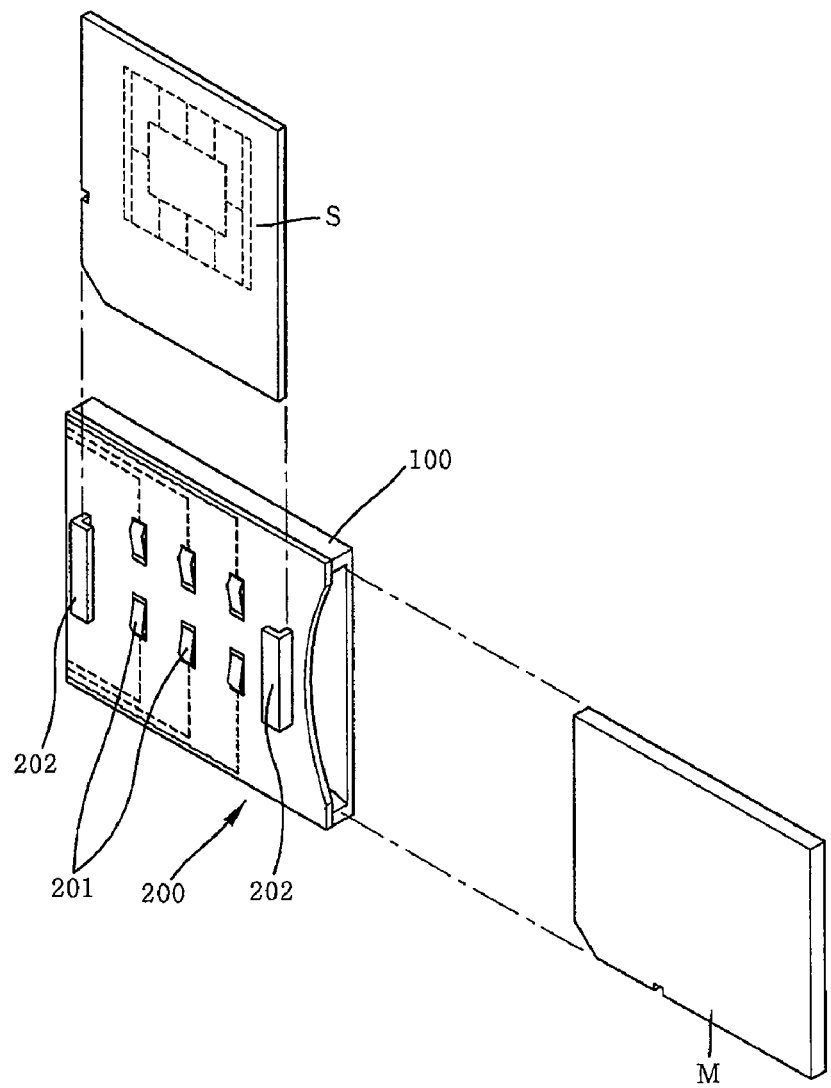
FIG. 6 is an exploded perspective view of a memory card socket of the mounting socket of FIG. 5.

As shown in FIG. 3, the memory card M is inserted into a space defined between the card housing 30 and the upper surface of the separating plate 20. Once the memory card M is inserted, the memory card connecting terminals 11, arranged in the first terminal receiving openings 12, come into close contact with a lower surface of the memory card M, achieving connection of the memory card M. In this case, the user can easily insert the memory card M deeply into the card housing 30 through the top opening 34 of the card housing 30 having the open end. As shown in FIG. 3, the SIM card S is inserted into a space between the card insertion recess 13, defined at the upper surface of the socket body 10, and a lower surface of the separating plate 20 defining the ceiling of the card insertion recess 13. Once the SIM card S is inserted, the SIM card connecting terminals 14, arranged in the second terminal receiving openings 15, come into contact with the SIM card, achieving connection of the SIM card S. As described above, the SIM card S is inserted into the socket body 10, and the memory card M is inserted into a space defined between the separating plate 20 and the card housing 30, which are made of thin metal plates; therefore, the overall thickness of the mounting socket can be significantly reduced.

As apparent from the above description, the present invention provides a mounting socket for the memory card M and the SIM card S for, for example, a mobile phone. The memory card socket, which separates the SIM card S and the memory card M from each other, and the SIM fixing member, which is used to fix the SIM card S, have a significantly reduced thickness, improving adaptability to a slim mobile phone. Further, with the provision of the thin mounting socket, the present invention has the effect of reducing the overall thickness of the mobile phone. Further, the present invention has the effect of assuring easy separation and coupling of constituent components, resulting in easy assembly of the mounting socket. Furthermore, the present invention has the effect of efficiently preventing short circuiting between the SIM card connecting terminals 14 and the memory card connecting terminals 11 and metal plates of the mounting socket.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A mounting socket, comprising:
   an insulating socket body provided with a card insertion recess, a plurality of first terminal receiving openings and a plurality of second terminal receiving openings, the card insertion recess extending over a portion of the socket body provided with the second terminal receiving openings, the first terminal receiving openings being provided in a remainder of the socket body;
   memory card connecting terminals arranged in the first terminal receiving openings and extending above an upper surface of the socket body;
   subscriber identification module card connecting terminals arranged in the second terminal receiving openings and extending into the card insertion recess;
   a metal separating plate substantially covering the subscriber identification module card connecting terminals and defining a top surface of the card insertion recess, the metal separating plate engaging an upper surface of the insulating socket body, the insulating socket body configured to simultaneously receive a memory card and a subscriber identification module (SIM) card on opposite sides of the metal separating plate; and
   a metal card housing substantially covering the memory card connecting terminals and the upper surface and an outer side surface of the socket body, the metal card housing engaging a top surface of the metal separating plate.

2. The mounting socket of claim 1, wherein the separating plate is made of a thinner and harder material than the socket body.

3. The mounting socket of claim 1, wherein the separating plate is removable from the socket body.

4. The mounting socket of claim 1, wherein the card housing is made of a thinner and harder material than the socket body.

5. The mounting socket of claim 1, wherein the socket body includes upwardly-protruding coupling portions formed at opposite side ends of the card insertion recess and the separating plate includes inverted U-shaped coupling portions formed at opposite side ends thereof that engage the upwardly-protruding coupling portions on the socket body.

6. The mounting socket of claim 5, wherein the upwardly-protruding coupling portions of the socket body include coupling protrusions and the inverted U-shaped coupling portions of the separating plate have coupling openings that receive the coupling protrusions.

7. The mounting socket of claim 5, wherein the separating plate includes elastic supporting members on a side of the separating plate opposite the card insertion opening.

8. The mounting socket of claim 1, wherein the card housing is slidably mounted on the socket body.

9. The mounting socket of claim 1, wherein the card housing includes at least one short-circuit-proof opening arranged opposite the memory card connecting terminals for preventing short circuiting between the card housing and the memory card connecting terminals.

10. The mounting socket of claim 1, wherein the separating plate includes at least one short-circuit-proof opening arranged opposite the subscriber identification module card connecting terminals for preventing short circuiting between the separating plate and the subscriber identification module card connecting terminals.

11. The mounting socket of claim 7, wherein the supporting members are formed at inner side surfaces of inverted U-shaped coupling portions of the separating plate.

12. The mounting socket of claim 1, wherein the card housing includes side walls having inwardly-bent low ends.

13. The mounting socket of claim 12, further comprising:
   fixing openings formed at distal ends of both of the side walls;
   outwardly-inclined protrusions formed with the socket body;
   wherein the fixing openings are positioned correspondingly with the outwardly-inclined protrusions.

14. The mounting socket of claim 13, wherein both the side walls of the card housing slide along both side surfaces of the socket body, the card housing coupled to the socket body when the outwardly-inclined protrusions of the socket body are elastically inserted into the fixing openings of the card housing connecting the card housing and the socket body.

* * * * *